United States Patent
Fowler

(10) Patent No.: US 6,459,078 B1
(45) Date of Patent: Oct. 1, 2002

(54) IMAGE SENSOR UTILIZING A LOW FPN HIGH GAIN CAPACITIVE TRANSIMPEDANCE AMPLIFIER

(75) Inventor: Boyd Fowler, Sunnyvale, CA (US)

(73) Assignee: Pixel Devices International, Inc., Sunnyvale, CA (US)

( * ) Notice: Subject to any disclaimer, the term of this patent is extended or adjusted under 35 U.S.C. 154(b) by 134 days.

(21) Appl. No.: 09/729,751

(22) Filed: Dec. 4, 2000

(51) Int. Cl.$^7$ ................................................. H01J 40/14
(52) U.S. Cl. .............................. 250/214 A; 250/208.1; 250/214 R; 348/606
(58) Field of Search .......................... 250/208.1, 214 R, 250/214 A; 330/309; 327/337; 348/241, 300, 606, 607

(56) References Cited

U.S. PATENT DOCUMENTS

| | | | |
|---|---|---|---|
| 6,169,440 B1 * | 1/2001 | Liu .............................. | 327/336 |
| 6,248,991 B1 * | 6/2001 | Chen et al. ............... | 250/208.1 |
| 6,339,363 B1 * | 1/2002 | Fowler .................... | 250/214 A |

* cited by examiner

Primary Examiner—Stephone Allen
Assistant Examiner—Bradford Hill
(74) Attorney, Agent, or Firm—Calvin B. Ward

(57) ABSTRACT

An imaging element and an imaging array constructed from such elements. The preferred imaging element is constructed from a photodiode having a parasitic capacitance $C_{pd}$; and an amplifier for measuring the charge stored on the parasitic capacitor. The amplifier includes an opamp having a signal input, reference input and output; the first terminal of the parasitic capacitor is connected to the signal input. The imaging element includes a reset switch for shorting the signal input and the output of the opamp, and capacitive network. The capacitive network connects the signal input and the output of the opamp, and provides a capacitance of $C_T$ between the signal input and the output of the opamp wherein $C_T<C_{pd}$. The capacitive network is constructed from a plurality of component capacitors. Preferably each component capacitor has a capacitance greater than or equal to $C_{pd}$. An imaging array according to the invention includes a plurality of imaging elements, a signal bus, a reset bus, and a reset circuit. Each imaging element also includes a coupling switch for connecting the output of the opamp to the signal bus and a reset coupling switch for connecting the photodiode to the reset bus via a low-pass filter. The reset circuit includes a second opamp having a signal input, a reference input connected to a second reference potential, and an output connected to the reset bus; and a reset coupling switch for connecting the signal input of the second opamp to the signal bus.

7 Claims, 3 Drawing Sheets

IMAGE SENSOR UTILIZING A LOW FPN HIGH GAIN CAPACITIVE TRANSIMPEDANCE AMPLIFIER

BACKGROUND OF THE INVENTION

While imaging arrays based on CCDs have become common, these arrays have two drawbacks. First, the technology used to fabricate such arrays has a significantly lower yield than that used to fabricate CMOS circuitry. CCD arrays have large areas of gate oxide. These areas are prone to shorts. These electrical shorts, in turn, reduce the yield of useful chips, and hence, increase the cost of the devices.

The second problem with CCD arrays lies in the lower bound for the noise in the sensor arrays. Many imaging problems of interest require the imaging array to sense very low levels of light. The minimum level that an array can sense depends on the minimum noise in the sensors.

In principle, both of these drawbacks can be overcome by utilizing CMOS image sensors. The CMOS yields are significantly better than those of the CCD fabrication process. In addition, the minimum noise levels achievable with CMOS-based sensors are substantially lower than those that can be obtained with CCDs.

CMOS image sensing arrays have been limited, however, by so called "fixed pattern noise" (FPN). Each image sensor in a CMOS array typically includes an amplifier for converting the small amount of charge stored on the parasitic capacitance of the imaging element to a voltage or current. Consider an array of such imaging elements. To provide a high quality image, each element must have the same response characteristics. Consider an imaging array in which the amplifier generates a voltage that is linearly related to the amount of light that fell on the imaging element. Each imaging element can be characterized by an offset and gain. That is, the voltage, $V_i$, generated by the $i^{th}$ amplifier is related to the offset, $O_i$, for that element and the gain, $G_i$, by $$V_i = O_i + G_i I \quad (1)$$

where I is the light incident on the $i^{th}$ element since the last time the imaging element was reset. To provide a high quality image all of the $O_i$ must be the same, i.e., $O_i = O$, and all of the gains, $G_i$ must be the same, i.e., $G_i = G$. The extent to which $O_i$ is different from O is referred to as the offset FPN of the array, and the extent to which $G_i$ is different from G is referred to as the gain FPN of the array. It should be noted that these noise values are constant for any given array. For any given pixel, $G_i - G$ does not change in time.

In addition to the offset and gain FPN, there is a third type of noise, referred to as the temporal noise which reflects the variation of $V_i$ from measurement to measurement. This noise is related to the various shot, thermal, and 1/f noise sources in the image sensor.

As CMOS sensors are pushed to ever-lower light levels, the relative magnitude of the gain and offset FPN increases leading to degraded images. To provide the high gain levels needed at low light levels without introducing additional temporal noise, capacitive transimpedance amplifiers are used. The gain of such amplifiers depends on the ratio of the capacitance of the sensor to that of the capacitance of the feedback loop in the amplifier. Hence, to obtain high gain, the feedback capacitor must be much smaller than the sensor capacitor. The variations in these capacitors determines the gain FPN of the array. Hence, the dimensions of the capacitors must be held to very tight tolerances to prevent the introduction of gain FPN.

A capacitor is constructed by overlapping two metal electrodes that are separated by a dielectric layer. For any given fabrication process, there is a point at which the ability to control the degree of overlap and size of the electrodes becomes a problem. In general, one would like to have the capacitance of the photodiode be as small as possible so that the charge sensitivity will be as high as possible. Hence, the photodiode capacitance is set to be just big enough to assure that the capacitance does not vary substantially from image to image. However, if this is the case, the feedback capacitor, which must have a small fraction of the capacitance of the photodiode, will be too small to be reliably constructed.

Offset FPN arises from variations in the amplifier threshold levels. To remove offset FPN, each diode-amplifier pair must be reset such that the output voltage of the amplifier is the same for each such pair. In addition, the reset must be accomplished in a manner that does not increase the temporal noise and does not increase the size of the sensing element. Alternatively, some prior art devices utilize schemes in which the offset FPN is recorded for each device and the image is then corrected for that measured offset FPN. While such schemes can remove the offset FPN, they require complex circuitry and/or memory arrays that increase the cost of the imaging devices.

Broadly, it is the object of the present invention to provide an improved image sensor.

It is a further object of the present invention to provide an image sensor that has reduced gain FPN relative to prior art devices.

It is a still further object of the present invention to provide an image sensor that has reduced offset FPN without requiring a separate storage array for storing the offset values.

It is a still further object of the present invention to provide an image sensor that has reduced temporal reset noise.

These and other objects of the present invention will become apparent to those skilled in the art from the following detailed description of the invention and the accompanying drawings.

SUMMARY OF THE INVENTION

The present invention is an imaging element and an imaging array constructed from such elements. The preferred imaging element is constructed from a photodiode having a parasitic capacitance $C_{pd}$; and an amplifier for measuring the charge stored on the parasitic capacitor. The amplifier includes an opamp having a signal input, reference input, and output; the first terminal of the parasitic capacitor is connected to the signal input. The imaging element includes a reset switch for shorting the signal input and the output of the opamp (operational amplifier), and capacitive network. The capacitive network connects the signal input and the output of the opamp, and provides a capacitance of $C_T$ between the signal input and the output of the opamp wherein $C_T < C_{pd}$. The capacitive network is constructed from a plurality of component capacitors. Preferably each component capacitor has a capacitance greater than or equal to $C_{pd}$. In one embodiment of the invention, the capacitive network includes first, second, and third component capacitors, each capacitor having first and second terminals. The first terminal of the first capacitor is connected to the output of the opamp; the second terminal of the first capacitor, the first terminal of the second capacitor, and the first terminal of the third capacitor are connected together at a first common node, the second terminal of the third capacitor is connected to the signal input of the opamp, and the second terminal of the second capacitor is connected to the second terminal of the parasitic capacitor. The capacitive network also includes a first network switch for connecting the first common node to the output of the opamp.

An imaging array according to the present invention includes a plurality of imaging elements, a signal bus, a reset bus, and a reset circuit. Each imaging element also includes a coupling switch for connecting the output of the opamp to the signal bus and a reset coupling switch for connecting the photodiode to the reset bus via a low-pass filter. The reset circuit includes a second opamp having a signal input, a reference input connected to a second reference potential, and an output connected to the reset bus; and a reset coupling switch for connecting the signal input of the second opamp to the signal bus. In the preferred embodiment of the present invention, low-pass filters are constructed from a network of capacitors.

DETAILED DESCRIPTION OF THE INVENTION

Figure 1:
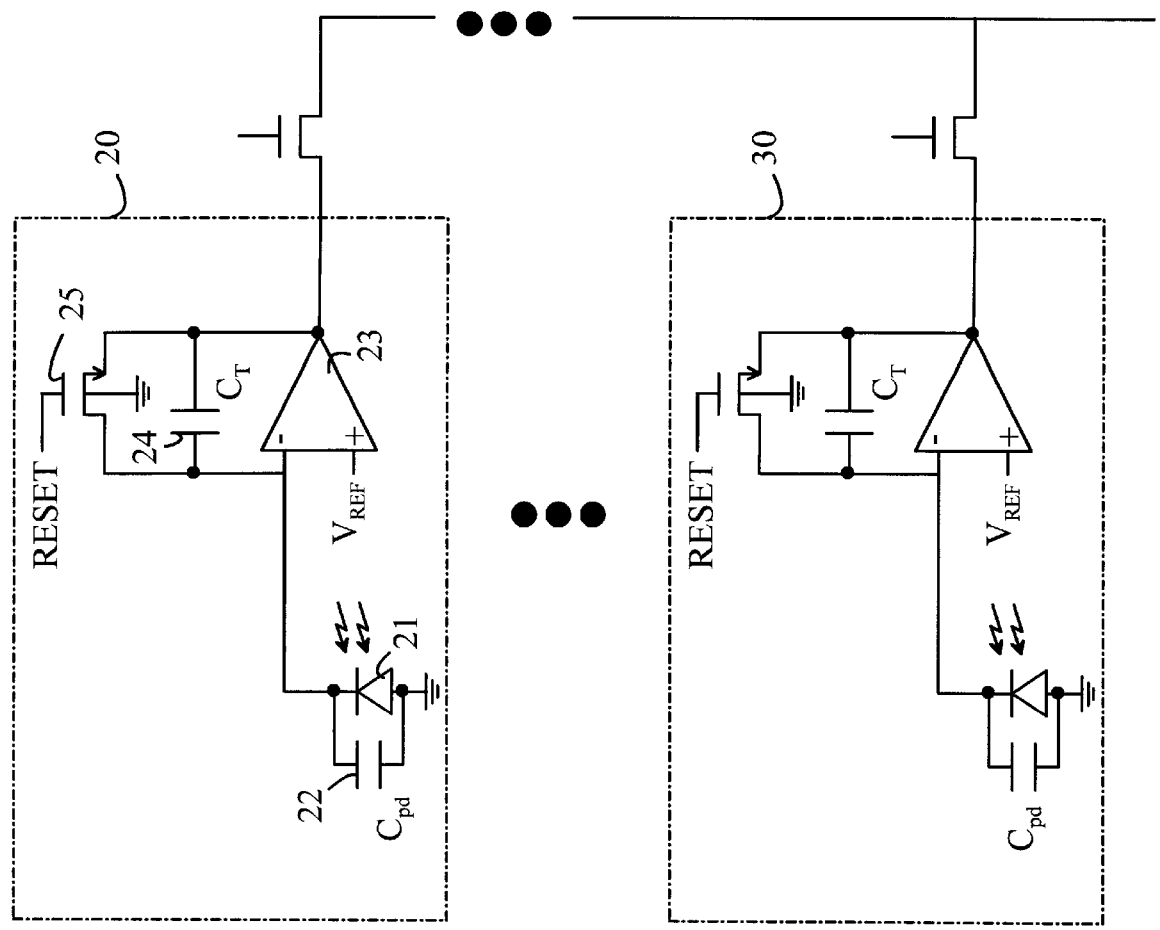
FIG. 1 is a schematic drawing of a portion of prior art image sensor array 10 representing one column of a two-dimensional array.

The manner in which the present invention obtains its advantages can be more easily understood with reference to FIG. 1 which is a schematic drawing of a portion of prior art image sensor array 10. The portion of the array shown in FIG. 1 represents one column of a two-dimensional array. Exemplary imaging elements are shown at 20 and 30. Each imaging element in the column includes a photodiode and a capacitive transimpedance amplifier. The photodiode for imaging element 20 is shown at 21. The photodiode has a parasitic capacitance shown at 22. The capacitance of this capacitor will be denoted by $C_{pd}$ in the following discussion. The transimpedance amplifiers are constructed from an opamp and a capacitive feedback loop. The opamp for imaging element 20 is shown at 23, and the feedback capacitor is shown at 24. The capacitance of the feedback capacitor will be denoted by $C_T$ in the following discussion. Each imaging element also has a reset switch for shorting the input and output of the opamp prior to accumulating charge. The reset switch is typically a transistor such as transistor 25.

The gain of the transimpedance amplifier is proportional to $C_{pd}/C_T$. Hence, to provide high gain, $C_{pd} \gg C_T$. In addition, to minimize gain FPN, $C_{pd}/C_T$ needs to be constant over the array. $C_{pd}$ is normally set to be as small as possible because $C_{pd}$ is proportional to pixel size and pixel size is proportional to sensor cost. Since $C_{pd} \gg C_T$ and $C_{pd}$ is typically very small $C_T$ is too small to be reproducible over the array, and the resulting arrays have suffered from gain FPN.

Figure 2:
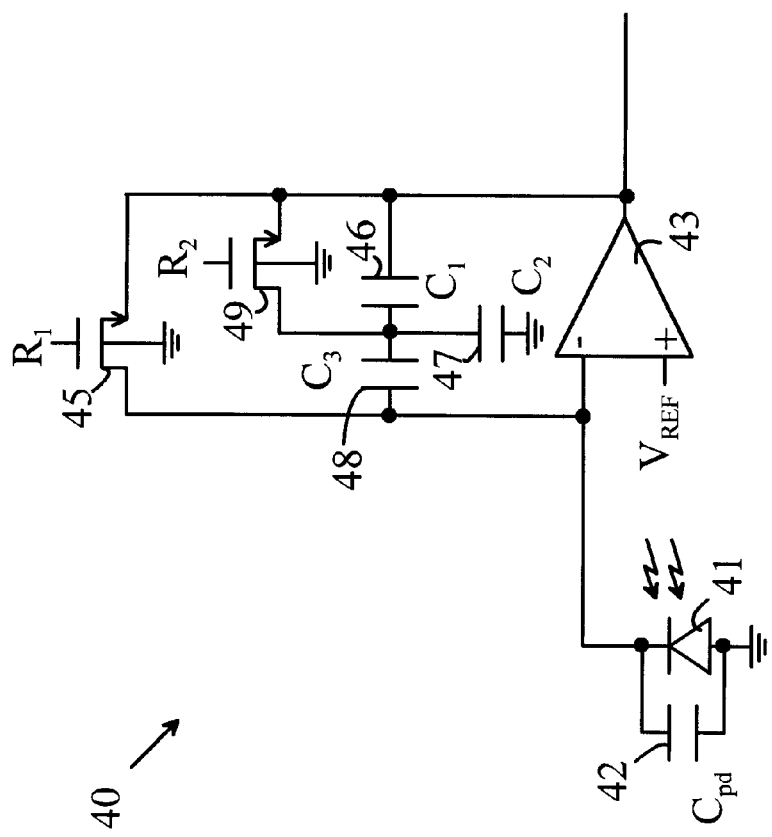
FIG. 2 is a schematic drawing of an imaging element 40 according to the present invention.

The present invention overcomes this problem by replacing the feedback capacitor 24 with a network of capacitors constructed from capacitors that are large enough to be reproducibly fabricated. The capacitors are chosen such that the network has a capacitance that is small compared to $C_{pd}$. Refer now to FIG. 2, which is a schematic drawing of an imaging element 40 according to the present invention. Imaging element 40 is similar to imaging element 20 shown in FIG. 1 in that it includes a photodiode 41 having a parasitic capacitor 42 having a capacitance denoted by $C_{pd}$. Imaging element 40 also includes a capacitive transimpedance amplifier constructed from an opamp 43 and a capacitive network consisting of capacitors 46–48 whose capacitances will be denoted by $C_1$–$C_3$, respectively, in the following discussion. Reset switches 45 and 49 short the capacitors prior to accumulating charge. The capacitance of the network is $C_3C_1/(C_1+C_2+C_3)$. Hence, if $C_3$ and $C_1$ are about the same size as $C_{pd}$, i.e., $C_1=C_3=C_{pd}$ and $C_2=G^*C_{pd}$, where $G \gg 1$, the resulting network will have a capacitance that is approximately $C_{pd}/G$, and all of the capacitors will be of a size that can be reproducibly fabricated. The reset switches are preferably operated such that switch 49 closes prior to switch 45. This order of operation minimizes the effects of the noise generated by the electrons leaving the transistors when the state of the switches changes.

Figure 3:
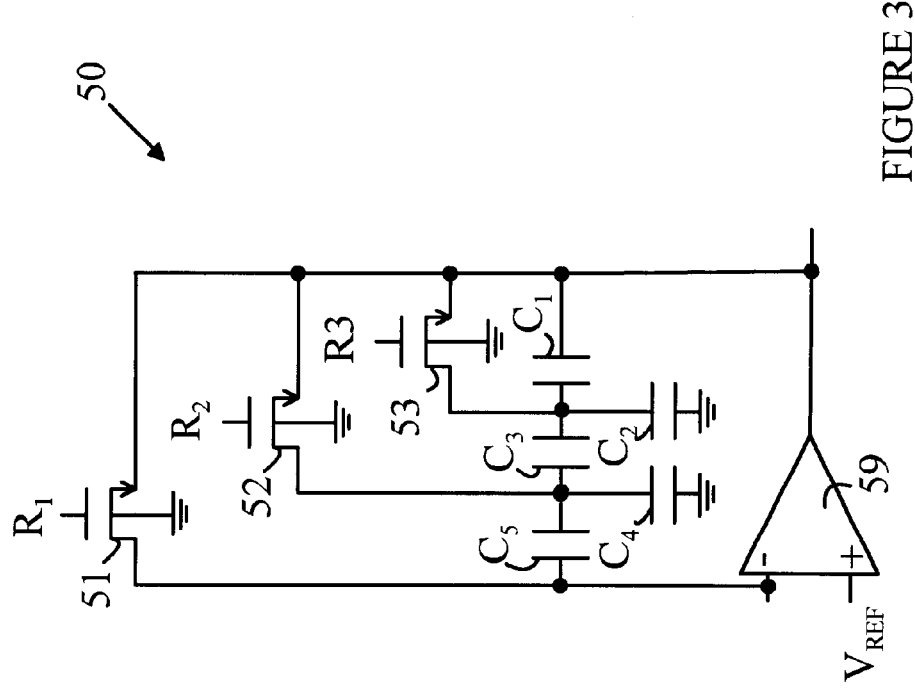
FIG. 3 is a schematic drawing of another embodiment of a transimpedance amplifier according to the present invention.

While the embodiment shown in FIG. 2 utilizes a three capacitor network and two shorting switches, it will be obvious to those skilled in the art from the preceding discussion that more complex networks may be utilized. Refer now to FIG. 3, which is a schematic drawing of another embodiment of a transimpedance amplifier according to the present invention. Transimpedance amplifier 50 is constructed from an opamp 59 and a capacitive feedback loop constructed from a 5 capacitor network whose capacitances are denoted by $C_1$–$C_5$. This network utilizes three shorting switches shown at 51–53. Transimpedance amplifier 50 provides higher gain for the same size capacitors. For example, if $C_1=C_3=C_5=C_{pd}$, and $C_2=C_4=G^*C_{pd}$, then the effective capacitance of the network is approximately $C_{pd}/G^2$, and the gain of the transimpedance amplifier will be $G^2$.

The arrangement shown in FIG. 3 has the further advantage of providing a transimpedance amplifier with switchable gain. If during the operation of the amplifier shorting switch 53 remains closed, the effective capacitance of the network will increase, and the gain will decrease accordingly.

It will be apparent from the preceding discussion, that other capacitive networks may be utilized. For example, the networks shown in FIGS. 2 and 3 can be extended further by incorporating additional capacitive dividers and shorting switches. In addition, any other capacitive network connected so as to provide a net capacitance that is much less than $C_{pd}$ may also be used. It should be noted that a purely capacitive network is preferred, because resistors introduce thermal noise into the system. In this regard, it should be noted that inductors always have finite resistances, and hence, inductive networks are not preferred.

Figure 4:
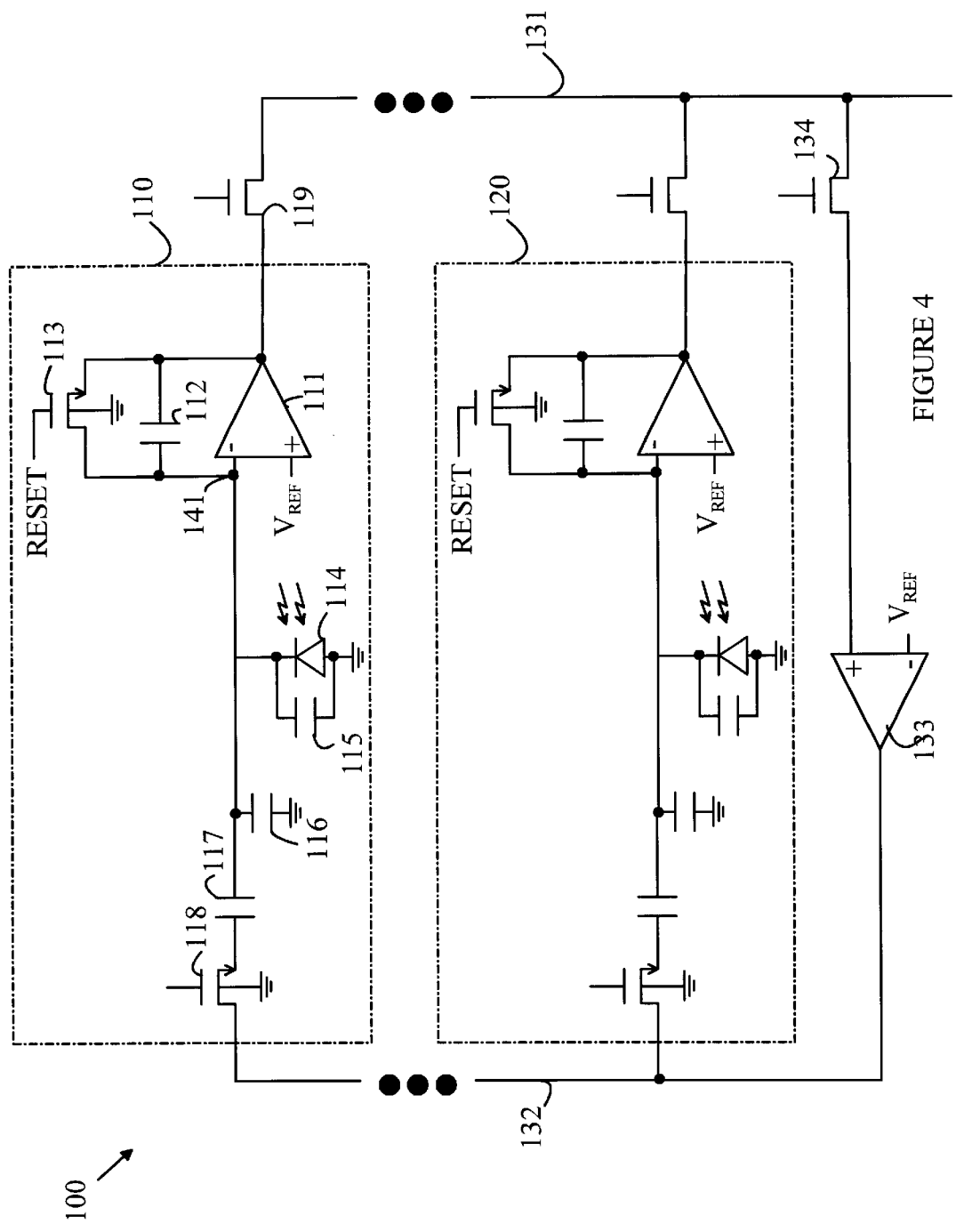
FIG. 4 is a schematic drawing of one column of an imaging array 100 made up of imaging elements according to the present invention.

While the capacitive feedback networks described above substantially decrease gain FPN, these networks do little to eliminate offset FPN. Refer now to FIG. 4, which is a schematic drawing of one column of an imaging array 100 made up of imaging elements according to the present invention. Exemplary imaging elements are shown at 110 and 120. Imaging element 110 includes a capacitive transimpedance amplifier constructed from opamp 111 and a capacitive feedback network, preferably of the type discussed above. To simplify the drawings, the capacitive feedback network is shown as a single capacitor 112; however, it is to be understood that capacitor 112 can be a single capacitor or any form of capacitive network such as those discussed above. The form of capacitive feedback loop does not alter the manner in which the present invention reduces offset FPN. Imaging element 110 also includes a photodiode 114 having a parasitic capacitance shown at 115. Each imaging element in array 100 can be connected to a readout bus 131 by turning on a bus isolation transistor. The bus isolation transistor for imaging element 110 is shown at 119. Each imaging element can also be connected to a reset bus 132 by turning on a reset isolation transistor. The reset isolation transistor for imaging element 110 is shown at 118.

Offset FPN is the result of charge being injected into node 141 when reset switch 113 is opened prior to accumulating charge from photodiode 114. The amount of charge injected into this node will, in general, be different for each imaging element due to variations in the reset switches from imaging element to imaging element. These variations result from variations in the fabrication process for these transistors. It should be noted that space is at a premium in an imaging array, and hence, these transistors are constrained to be as small as possible. As noted above, small structures have greater variability, especially when the size of the transistor is of the same order as the minimum feature size that is available in the fabrication process.

The present invention overcomes this variability by providing an offset feedback loop that forces all of the outputs of the opamps to be the same after the reset process is completed. The offset feedback loop utilizes an opamp 133, which is shared by all of the imaging elements in a column. Since only one opamp 133 is needed per column, the space constraints that apply to opamp 111 and reset switch 113 do not apply to opamp 133. Accordingly, opamp 133 is preferably much larger than opamp 111 and switch 113. In addition, opamp 133 can also incorporate internal offset correction to further reduce column based offset FPN. This assures that opamp 133 is reproducible from column to column and contributes an insignificant amount of offset FPN.

During the reset operation, opamp 133 is connected to readout bus 131 by switch 134. Each imaging element in the column is reset in sequence by connecting that imaging element to buses 131 and 132. Opamp 133 then forces the output of the imaging element to be VHF, by transferring charge to the input of the opamp in that imaging element. This charge transfer needs to be accomplished in a manner that does not introduce additional offset FPN or temporal noise.

The manner in which the reset loops operate will be discussed with reference to imaging element 110. First, switch 113 is closed to short capacitor 112. Switch 113 is then opened. If capacitor 112 is constructed from a network that includes switches that short the internal nodes of the network as described above, the internal nodes are first shorted by closing and opening the internal switches in the capacitive network. Switch 118 is then closed to allow opamp 133 to pump charge to node 141. The opening and closing of switch 118 can generate offset noise as well as temporal noise, i.e., thermal and shot noise. To reduce the effects of this noise source, a low pass filter consisting of capacitors 116 and 117 is utilized. Since the magnitude of the thermal noise depends on the bandwidth of the signal, the low pass filter limits the thermal noise. It should be noted. that a capacitive low-pass filter is utilized because capacitors do not introduce additional temporal noise for the reasons previously discussed.

Various modifications to the present invention will become apparent to those skilled in the art from the foregoing description and accompanying drawings. Accordingly, the present invention is to be limited solely by the scope of the following claims.

What is claimed is:

1. An imaging element comprising:
   a photodiode having a parasitic capacitance $C_{pd}$; and
   an amplifier for measuring the charge stored on said parasitic capacitor, said amplifier comprising:
      an opamp having a signal input, reference input and output, said first terminal of said source capacitor being connected to said signal input;
      a reset switch for shorting said signal input and said output of said opamp; and
      a capacitive network connecting said signal input and said output of said opamp, said capacitive network providing a capacitance of $C_T$ between said signal input and said output of said opamp wherein $C_T < C_{pd}$ and wherein said capacitive network is constructed from a plurality of component capacitors.

2. The imaging element of claim 1 wherein each component capacitor has a capacitance greater than or equal to $C_{pd}$.

3. The imaging element of claim 1, wherein said capacitive network comprises first, second, and third component capacitors, each capacitor having first and second terminals, said first terminal of said first capacitor being connected to said output of said opamp, said second terminal of said first capacitor, said first terminal of said second capacitor, and said first terminal of said third capacitor being connected together at a first common node, said second terminal of said third capacitor being connected to said signal input of said opamp, and said second terminal of said second capacitor being connected to said second terminal of said parasitic capacitor, said capacitive network further comprising a first network switch for connecting said first common node to said output of said opamp.

4. The imaging element of claim 3 wherein said first capacitor comprises a network constructed from fourth, fifth, and sixth component capacitors, said fourth, fifth, and sixth component capacitors being connected such that said fourth, fifth, and sixth capacitors are connected together at a common node, said network further comprising a second network switch for connecting said common node to said output of said opamp.

5. An imaging array comprising first and second imaging elements, a signal bus, a reset bus, and a reset circuit, each of said first and second imaging elements comprising:
   a photodiode having a parasitic capacitance $C_{pd}$; and
   an amplifier for measuring the charge stored on said parasitic capacitor, said amplifier comprising:
      a first opamp having a signal input, a reference input connected to a first reference potential, and an output, said first terminal of said source capacitor being connected to said signal input;
      a reset switch for shorting said signal input and said output of said first opamp;
      a capacitive feedback path connecting said signal input and said output of said first opamp;
      a first coupling switch for connecting said signal output of said first opamp to said signal bus; and
      a second coupling switch for connecting said reset bus to said photodiode via a low-pass filter connected between said photodiode and said second coupling switch;
   said reset circuit comprising:
      a second opamp having a signal input, a reference input connected to a second reference potential, and an output connected to said reset bus; and a reset coupling switch for connecting said signal input of said second opamp to said signal bus.

6. The imaging array of claim 5 wherein said low-pass filters comprise a network of capacitors.

7. The imaging array of claim 5, wherein said capacitive feedback path comprises first, second, and third component capacitors, each capacitor having first and second terminals, said first terminal of said first capacitor being connected to said output of said first opamp, said second terminal of said first capacitor, said first terminal of said second capacitor, and said first terminal of said third capacitor being connected together at a first common node, said second terminal of said third capacitor being connected to said signal input of said first opamp, and said second terminal of said second capacitor being connected to said second terminal of said parasitic capacitor, said capacitive feedback path further comprising a first network switch for connecting said first common node to said output of said first opamp.

* * * * *

UNITED STATES PATENT AND TRADEMARK OFFICE
CERTIFICATE OF CORRECTION

PATENT NO. : 6,459,078 B1
DATED : October 1, 2002
INVENTOR(S) : Fowler

It is certified that error appears in the above-identified patent and that said Letters Patent is hereby corrected as shown below:

Column 1,
Line 4, insert as first paragraph after title -- The present invention relates to CMOS imaging elements, and more particularly, to image sensors utilizing capacitive transimpedance. --

Column 4,
Line 35, replace "$C_1=C_3=C_3=C_{pd}$" with -- $C_1=C_3=C_5=C_{pd}$ --

Column 5,
Line 43, replace "VHF" with -- $V_{REF}$ --
Line 63, remove period "." after "noted".

Signed and Sealed this

Eleventh Day of February, 2003

JAMES E. ROGAN
*Director of the United States Patent and Trademark Office*